(12) United States Patent
Müller

(10) Patent No.: US 10,598,915 B2
(45) Date of Patent: Mar. 24, 2020

(54) METHOD FOR AUTOFOCUSING A MICROSCOPE AT A CORRECT AUTOFOCUS POSITION IN A SAMPLE

(71) Applicant: PerkinElmer Cellular Technologies Germany GmbH, Hamburg (DE)

(72) Inventor: Jürgen Rolf Müller, Hamburg (DE)

(73) Assignee: PerkinElmer Cellular Technologies Germany GmbH, Hamburg (DE)

( * ) Notice: Subject to any disclaimer, the term of this patent is extended or adjusted under 35 U.S.C. 154(b) by 349 days.

(21) Appl. No.: 15/320,984

(22) PCT Filed: Jun. 23, 2015

(86) PCT No.: PCT/EP2015/064078
§ 371 (c)(1),
(2) Date: Dec. 21, 2016

(87) PCT Pub. No.: WO2015/197601
PCT Pub. Date: Dec. 30, 2015

(65) Prior Publication Data
US 2017/0199367 A1    Jul. 13, 2017

Related U.S. Application Data

(60) Provisional application No. 62/015,916, filed on Jun. 23, 2014.

(51) Int. Cl.
G02B 21/24     (2006.01)
G02B 21/06     (2006.01)
G02B 21/02     (2006.01)

(52) U.S. Cl.
CPC .......... *G02B 21/245* (2013.01); *G02B 21/02* (2013.01); *G02B 21/06* (2013.01)

(58) Field of Classification Search
None
See application file for complete search history.

(56) References Cited

U.S. PATENT DOCUMENTS

| 4,687,913 A | 8/1987 | Chaban |
| 6,677,565 B1 * | 1/2004 | Wahl ............ G02B 7/346 |
| | | 250/201.3 |

(Continued)

FOREIGN PATENT DOCUMENTS

| DE | 102008015885 A1 | 10/2009 |
| EP | 1840623 A2 | 10/2007 |

(Continued)

Primary Examiner — Derek S. Chapel
(74) Attorney, Agent, or Firm — The Webb Law Firm

(57) ABSTRACT

A method for autofocusing a microscope at a correct autofocus position in a sample includes the steps: generating a reference pattern by an autofocus light device, projecting the reference pattern towards a sample, whereby the reference pattern is backscattered by at least two interfaces being located at or close to the sample, projecting the backscattered reference pattern towards a detector which provides spatial resolution, obtaining a superposition of a number of detection patterns, each detection pattern related to one of the interfaces, on the detector, analyzing the superposition of detection patterns to identify at least one autofocus detection pattern related to at least one of the interfaces, and analyzing the at least one autofocus detection pattern to determine the direction and/or magnitude of deviation of the microscope's current focus position from the correct focus position.

17 Claims, 2 Drawing Sheets

(56) References Cited

U.S. PATENT DOCUMENTS

2005/0121596 A1\* 6/2005 Kam .................. G01N 21/6458
250/201.2
2011/0017902 A1\* 1/2011 Hing ................... G02B 21/241
250/201.2

FOREIGN PATENT DOCUMENTS

| EP | 1930717 A1 | 6/2008 |
| --- | --- | --- |
| EP | 1969412 B1 | 3/2013 |
| GB | 2355354 A | 4/2001 |
| WO | 2008032100 A1 | 3/2008 |

\* cited by examiner

METHOD FOR AUTOFOCUSING A MICROSCOPE AT A CORRECT AUTOFOCUS POSITION IN A SAMPLE

CROSS-REFERENCE TO RELATED APPLICATIONS

This application is the United States national phase of International Application No. PCT/EP2015/064078 filed Jun. 23, 2015, and claims benefit of U.S. Provisional Patent Application No. 62/015,916 filed Jun. 23, 2014, the disclosures of which are hereby incorporated in their entirety by reference.

BACKGROUND OF THE INVENTION

Field of the Invention

The invention refers to a method for autofocusing a microscope at a correct autofocus position in a sample.

Automated focusing (autofocus) systems are commonly used in automated optical microscopy. In one common application, they enable an automated microscope to repeatedly move to locations of interest in a laterally extended sample, automatically find the plane of sharp focus, and acquire one or multiple images of the sample. In this application, the autofocus enables the automated microscope to compensate for tilt and warp of the sample carrier, which may e.g. be a microscopic slide or a microtiter plate, or of the sample itself. Another common use of autofocus systems is to compensate for mechanical or thermal drifts in either the microscope or the sample during long-term observation of a sample.

Description of Related Art

Two fundamental types of autofocus systems are known in the art:
(a) "Image-based" autofocus systems typically use the light source and camera detector of the main microscope, i.e. the light source and detector which are also used for acquiring the actual sample images of interest. In an iterative approach, an image of the sample is acquired, the image is evaluated by a computer-implemented image analysis to estimate a deviation from the correct focus plane, and the microscope's focus height is varied under computer control. These steps are repeated until the correct focus plane has been reached with acceptable accuracy.
(b) "Active" autofocus systems use dedicated light sources and detectors. Using the dedicated light source, a known reference pattern is projected through the microscope objective towards the sample. Reference patterns are simple in structure; most often a single spot is used, but other structures like grid or line structures may also be used. The dedicated detector typically comprises a single detector element or a small number of detector elements, e.g. photodiodes, which receive light backscattered through the microscope objective from a reference surface within or near the sample. By choosing a suitable arrangement of the autofocus light source and detector element(s), the detector provides information about the magnitude and/or direction of the deviation from the correct focus plane.

Image-based autofocus systems are cost-effective, because they require no additional hardware beyond what is required for the automated microscope itself (sample illumination, image capture by a camera, digitization and analysis by a computer connected to the camera). However, the focusing process is generally slow, as the camera exposure and image readout take significant time and the iterative approach needs to be repeated multiple times until the correct focus plane has been established.

Conversely, active autofocus systems can be significantly faster. Exposure and readout time of the dedicated detector is typically much faster than for a camera. Also, properly designed active autofocus systems can provide from a single focus measurement a direct estimate of the magnitude and direction of the deviation from the correct focus plane, which enables them to establish the correct focus plane in a single step, or in a small number of iterative steps.

However, active autofocus systems are limited in their ability to deal with complex samples. The active autofocus systems known in the art rely on the presence of a single well-defined reference surface within or near the sample, which provides the backscattered light to be detected by the autofocus detector. If additional interfaces, which also created backscattered light, are present in or near the sample, these autofocus systems will determine the plane of focus incorrectly, as the magnitude and direction signals are falsified by the additional light backscattered from planes in different axial positions. Such additional interfaces are commonly present in samples to be analyzed, e.g. stemming from the interface of the sample or its embedding fluid with the surrounding air. Commonly, while the presence of additional interfaces is known a priori, their distance from the reference surface—and hence the magnitude of spurious autofocus signal contributions—is not known, and may vary from sample to sample. Therefore, simple corrections to the autofocus signal (e.g. constant offset corrections) are generally not applicable.

A solution to this problem known in the art is to design the autofocus optical path with a short focal length and high numerical aperture. This will cause the backscatter contributions from out-of-focus interfaces to become rapidly blurred with increasing distance of each interface from the correct focus position, such that only a negligible amount of backscattered light from these additional interfaces is directed towards the detector via the microscope objective. However, this design has the significant disadvantage of also reducing the capture range of the autofocus system—i.e. the range of axial positions around the correct focus plane where signals backscattered from the reference surface can be detected and analyzed, in order to determine the distance and direction towards the correct focus position, becomes conversely smaller. If signals from additional interfaces spaced a distance D away from the reference surface are to be effectively suppressed, the capture range for reliably detecting autofocus signals from the reference surface will also be limited to the order of magnitude of D.

SUMMARY OF THE INVENTION

The present invention aims to provide a method for autofocusing a microscope with a correct autofocus position in a sample avoiding these limitations of the known autofocus systems. The inventive autofocus method aims to provide robust operation in the presence of multiple interfaces within or near the sample, while still affording a large capture range and fast focusing in a single step or a small number of iterations.

This and other objects are solved by a method for autofocusing a microscope at a correct autofocusing position in a sample set forth in the present disclosure.

The inventive method for autofocusing a microscope at a correct autofocusing position in a sample comprises in a first step the generating of a reference pattern by an autofocus light device. The autofocus light devise may comprise a light source and lenses. The reference pattern is projected towards the sample to be analyzed. The reference pattern is backscattered by at least two interfaces being located at or close to the sample. If the sample is for example carried by a transparent slide, interfaces occur between the air and an outer surface of the slide, between an inner surface of the slide and a sample and between the sample and surrounding air or between the sample and a second slide or coverslip. If a second slide is used, an additional interface occurs between the outer surface of the second slide and the air. Similar interfaces are present if the sample is for example located in a microtiter plate.

The backscattered reference pattern is projected towards a detector which provides spatial resolution. On the detector a number of detection patterns can be detected. Each of the detected detection patterns relates to one of the interfaces being located at or close to the sample. These detection patterns are superimposed on the detector. Depending on the reference pattern generated by the autofocus light device, the detector can be a one-dimensional-/line detector or a two-dimensional-/array detector. It is possible to use a separate detector or to use the detector or camera of the microscope itself. Preferably, the used detector is an image detector.

By use of the detector, a superposition of a number of detection patterns is obtained. Each detection pattern relates to one of the interfaces.

Preferably, the signals from the detector which represent the superposition of the detection patterns are digitized and are transferred to a computer for analysis. Within the next step the superposition of the detection patterns is analyzed to identify at least one autofocus detection pattern related to at least one of the interfaces, as defined in more detail below. The autofocus detection pattern is the pattern of a chosen or defined interface. Within the next step, the at least one autofocus detection pattern is analyzed to determine the direction and/or magnitude of deviation of the microscope's current focus position from the correct focus position. Knowing the correct position and/or shape and/or size of a detection pattern that would be defined by a correct autofocus position, the direction and/or magnitude of deviation of the autofocus detection pattern from the correct autofocus position can be determined.

In a preferred embodiment, the backscattered reference pattern is projected towards the detector, which preferably is an image detector, through the microscope objective. It is particularly preferred that the reference pattern is also projected towards the sample through the microscope objective. Furthermore, it is preferred that the position and/or size and/or shape of each detection pattern on the detector depends on the position of the related interface relative to the microscope objective. Furthermore, it is preferred that the position and/or size and/or shape of the superposition of detection patterns is analyzed to identify the at least one autofocus detection pattern related to at least one of the interfaces.

The method according to the invention is preferably performed by an autofocus system for microscopes which projects, a reference pattern from an autofocus light source into a sample through the microscope objective, and images the pattern backscattered from a reference surface within or near the sample onto a multi-element autofocus detector. The autofocus system is able to reliably determine the position of the reference surface relative to the microscope objective's focal plane, even in the presence of additional interfaces which backscatter light towards the autofocus detector. This is achieved by analyzing the spatial distribution of light across the autofocus detector and identifying the contributions backscattered from the reference surface and the additional interfaces, respectively, based on their size and/or shape and/or position. The contribution from the reference surface is then isolated and further analyzed to determine the magnitude and/or direction of the deviation of the current focus position from the correct focus position. Preferably, such analysis is performed by a computer which receives digitized signals from the detector.

The inventive autofocus system for microscopes preferably uses a dedicated autofocus light device and a multi-element autofocus detector, preferably a linear or two-dimensional array detector to perform the inventive method. For reasons of cost and simplicity, it is especially preferred to use a main camera of the microscope, i.e. a camera which is also used to acquire the sample images of interest, as the autofocus detector.

The used autofocus light device may comprise an autofocus light source, so one or more autofocus collimators and in a preferred embodiment an astigmatic lens. From the dedicated autofocus light device, a reference pattern is projected via an autofocus illumination beam path through the microscope objective and towards the sample. Light backscattered from a reference surface within or near the sample passes back through the microscope objective, and is directed via an autofocus detection beam path towards the autofocus detector, where it forms an autofocus detection pattern. The referenced surface is defined by one of the interfaces located at or close to the sample.

The autofocus illumination and detection beam path are designed such that, depending on the location of the reference surface/the chosen interface along the optical axis and relative to the microscope objective, the autofocus detection pattern changes its size, its position and/or its shape. Various approaches to obtain this position information, also called height encoding, are known in the art. For example, the reference pattern in the sample plane can be a single spot, resulting in an autofocus detection pat-tern which is also a spot, but changes its size (due to blurred, unfocused imaging), its shape (due to astigmatic, laterally distorted imaging) or its lateral position (due to the autofocus illumination and/or detection beam path being tilted relative to the microscope's optical axis) when the axial distance between the reference surface and the microscope objective is varied.

According to the invention, the signals from the multi-element autofocus detector are read and analyzed by a computer, in order to determine the magnitude and preferably the direction of the deviation of the current focus plane from the correct focus plane. The current focus plane is defined by the autofocus detection pattern on the detector, whereby this was selected from the number of detection patterns by analyzing the detection patterns to define the autofocus detection pattern. To this end, the size, shape and/or position of the autofocus detection pattern are analyzed, and compared to predetermined target values of size, shape and/or position for the plane of correct focus.

In contrast to active autofocus systems known in the art, the inventive autofocus method still functions reliably when one or more additional interfaces are present in/at or near the sample besides the reference surface. In this situation, each interface backscatters light from the autofocus light source towards the autofocus detector, and causes an autofocus detection pattern contribution on the autofocus detector, which pattern contribution has a size and/or shape and/or position corresponding to the axial distance of said interface from the microscope objective. In the presence of multiple interfaces, the total autofocus light intensity registered by the autofocus detector is therefore a superposition of multiple autofocus detection pattern contributions with different sizes and/or shapes and/or positions.

According to the invention, the computer reads and analyzes the distribution of autofocus light intensity across the multi-element autofocus detector. The analysis detects and separates the autofocus detection pattern contributions from the various interfaces, and identifies the contribution from the reference surface. The analysis then determines the direction and/or magnitude of deviation from the correct focus position by analyzing the detection pattern contributed by the reference surface only, preferably suppressing any contributions from other interfaces which would otherwise falsify the direction and magnitude information.

Identification of the autofocus detection pattern contribution from the reference surface (vs. other interfaces) can be achieved in various ways, depending on a priori knowledge of the sample geometry and/or the geometry close to the sample. Furthermore, a priori knowledge is preferred to comprise the knowledge of the number of interfaces and of their spatial order. Preferably, the a priori knowledge does not necessarily comprise the knowledge of all the spatial distances between the interfaces. It is possible to choose a single one of the interfaces as a reference surface to define the autofocus detection pattern. In this case, a single autofocus detection pattern relating to this interface is identified. In one common scenario the reference surface is the interface closest to the microscope objective. For example, the reference surface is the interface between a transparent substrate supporting the sample of interest and the air or fluid between the substrate and the microscope objective, whereas other interfaces exist between the substrate and the sample, and between the sample and the surrounding environment. In this case, the autofocus detection pattern contribution corresponding to the smallest objective/interface distance is the contribution from the reference surface.

In another common scenario, the reference surface is known to contribute the largest backscattered light signal, compared to contributions from other interfaces. (E.g. the reference surface is the inter-face which exhibits the largest step in the index of refraction, while other interfaces within or near the sample exhibit smaller steps in refractive index.) In this scenario, the brightest autofocus detection pattern contribution can be identified as the one corresponding to the reference surface.

The inventive autofocus method preferably comprises a motorized drive mechanism for adjusting the distance between the microscope objective and the sample, which is also under computer control. Based on the determination of the direction and magnitude of deviation from the correct focus position, the distance is automatically adjusted. In one preferred embodiment, only a single adjustment step, based on the analysis of a single autofocus detection pattern, is performed to obtain the desired focus position. In another preferred embodiment, a small number of further iterations of auto-focus measurement and distance adjustment are performed. Such iterations can improve the positioning accuracy in the presence of non-linearities or inaccuracies in the pre-determined relationship between the focus distance determined from the analysis of the autofocus detection pattern and the true focus distance.

The inventive autofocus method therefore provides multiple advantages:

It works robustly with samples where additional interfaces exist within or near the sample under observation, e.g. from substrates supporting the sample or from interfaces between the sample and the surrounding air or liquid.

It can be designed with a large capture range, i.e. with a beam path geometry that allows robust detection of a reference surface even when it is spaced away from the correct focus position, since the inventive autofocus system does not rely on a beam path with high numerical aperture and short focal distance to suppress signals from additional interfaces.

It enables fast focusing, since the magnitude and direction of the deviation from the correct focus plane can be determined from a single autofocus measurement. Slow search scans or iterative approaches to the correct focus position can be avoided; instead, the correct focus system can be established after a single measurement, or with a small number of iterative steps to improve accuracy.

The inventive autofocus system can be implemented in a cost-effective manner, especially when using the microscope's main camera as the autofocus detector. Only a dedicated auto-focus light source and autofocus illumination optics (condenser) are required.

The invention as described in more detail in accordance with the enclosed drawings showing two embodiments of the invention, whereby the invention is not restricted to these embodiments and whereby the features of the embodiments can be combined or exchanged.

DETAILED DESCRIPTION

Figure 1:
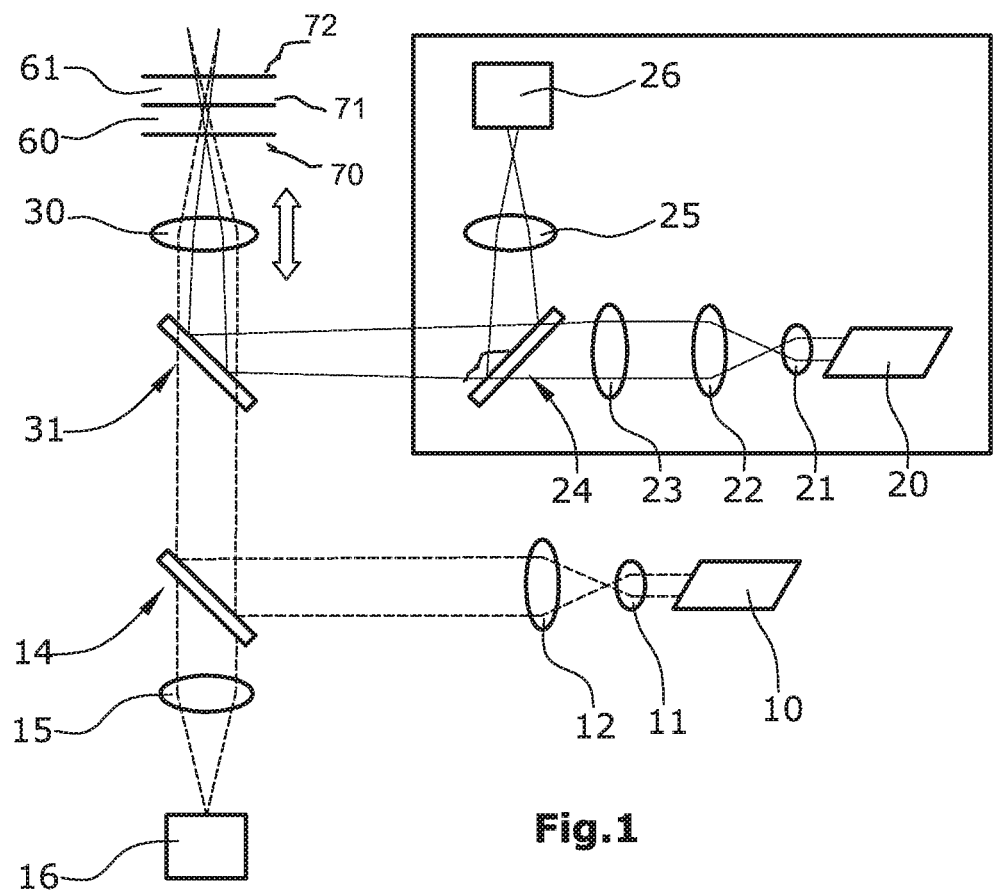
FIG. 1 shows a first preferred embodiment of a microscope having an autofocus system to perform the inventive method.

The microscope shown in FIG. 1 is comprised of light source 10 (which can comprise e.g. a laser, lamp, or a light emitting diode), collimation lenses 11 and 12, beam splitter 14 (which can be a dichroic beam splitter, for use in fluorescence microscopy, a polarization dependent beam splitter, or other beam splitter), tube lens 15, camera 16, and objective lens 30. Objective 30 can be moved in the axial direction under computer control to adjust the focus between objective 30 and sample 61. Alternatively, a movement of sample 61 can be implemented.

The sample 61 under observation is supported by substrate 60, which can e.g. be a glass coverslip or polymer foil. The interface 71 between substrate and sample is chosen as the reference surface. Nearby are further interfaces, namely interface 70 between substrate and surrounding air, and interface 72 between sample and surrounding air.

The autofocus system comprises an autofocus light device having an autofocus light source 20, autofocus collimator 21 and 22, astigmatic lens 23, beam splitter 24, imaging lens 25 and autofocus detector 26. It is coupled to the microscope beam path via beam splitter 31. The autofocus light source 20 can comprise e.g. a laser, lamp, light emitting diode. The autofocus detector 26 is a two-dimensional array detector, e.g. a CCD or CMOS camera.

In this embodiment, the autofocus system can operate continuously even during operation of the microscope's imaging system, if a wavelength is chosen for the autofocus light source 20 which is not of interest for the microscopic imaging of the sample under observation. For example, the autofocus light source 20 and detector 26 can operate in the near-infrared range, while the microscope's light source 10 and detector 16 operate in the visible range, and beam splitter 31 is a wavelength-dependent beam splitter which reflects near-infrared and passes visible light. Alternatively, the microscope and autofocus light sources 10, 20 and detectors 16, 26 can operate in the same or in over-lapping wavelength ranges, and are activated in a time-multiplexed fashion, i.e. automatic focusing and microscopic imaging are performed in alternating, sequential steps.

Figure 2:
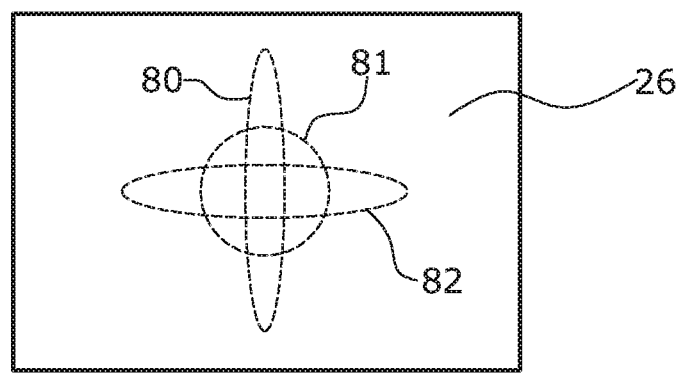
FIG. 2 shows schematically the autofocus detection pattern of the detector used in the autofocus system shown in FIG. 1.

FIG. 2 shows the autofocus detection pattern on autofocus detector 26 when reference surface 71 is in focus. Since the autofocus illumination passes astigmatic lens 23, the autofocus reference pattern projected towards the sample is a spot which is distorted in dependence of the axial distance between the objective 30 and the sample 61. With reference to FIG. 2, the autofocus detection pattern contributed by interface 70 is spot 80, the autofocus detection pattern contributed by reference surface 71 is spot 81, and the autofocus detection pattern contributed by interface 72 is spot 82.

In this example, it is known a priori that three interfaces exist in or near the sample, and that the middle interface is to be chosen as the reference surface. It is further known that the closer an inter-face lies to the microscope objective, the stronger the autofocus detection pattern contribution back-scattered from that interface is defocused in the Y direction (see coordinate system defined in FIG. 2). The computer analyzing this autofocus detection pattern therefore fits three ellipsoids with variable X:Y aspect ratios to the observed detection pattern, and identifies the ellipsoid with medium X:Y aspect ratio as the contribution from the reference surface. The deviation of this ellipsoid's shape from a circle provides a measure of the magnitude and direction of the deviation of the current focus position from the correct focus position: X:Y aspect ratios smaller than one indicate that the reference surface is too close to the objective, and X:Y ratios larger than one indicate that it is too far from the objective.

The above described method can be also performed by using the middle interface if the number of interfaces is uneven.

Figure 3:
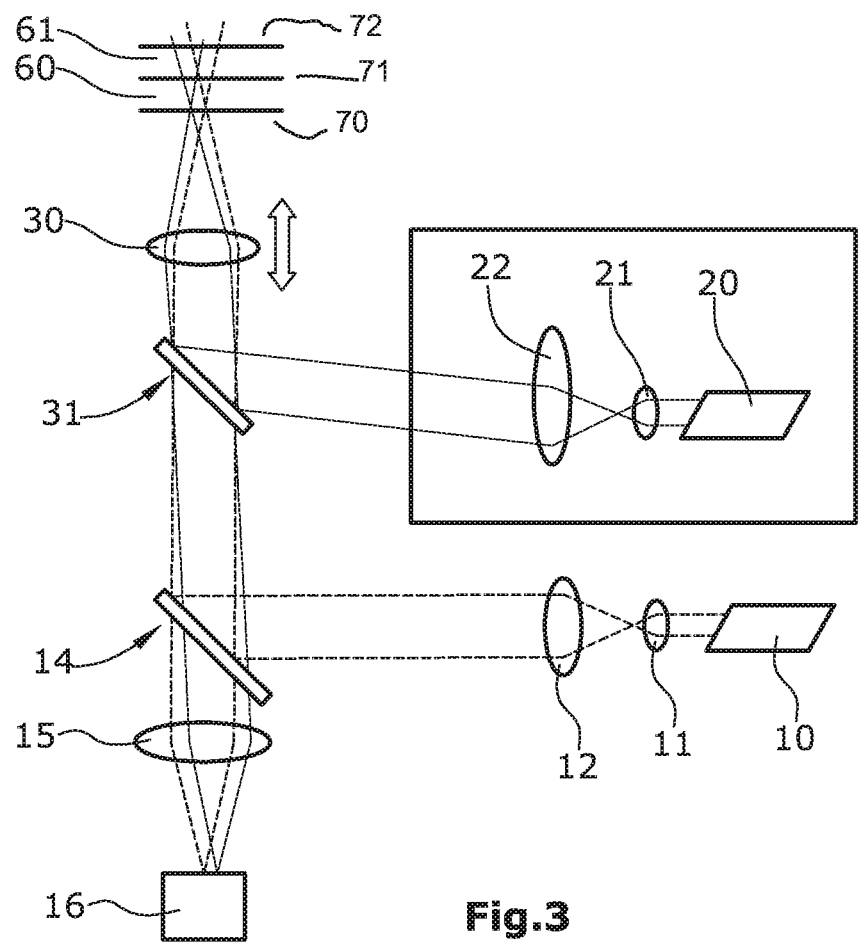
FIG. 3 shows a second preferred embodiment of a microscope having an autofocus system to perform the inventive method.

A microscope as shown in FIG. 3 is similar to the one shown in the previous example, and comprises light source 10, collimation lenses 11 and 12, beam splitter 14, tube lens 15, camera 16, and objective lens 30.

The sample under observation 61 is supported by substrate 60, which can e.g. be a glass coverslip or polymer foil. In this example, the interface 70 between surrounding air and substrate is chosen as the reference surface. Further interfaces nearby are interface 71 between substrate and sample, and interface 72 between sample and surrounding air.

The autofocus light device is significantly simplified in this embodiment, and comprises only autofocus light source 20 and autofocus collimator 21 and 22. It is coupled to the microscope beam path via beam splitter 31. Microscope camera 16, which can be e.g. a CCD or CMOS camera, also serves as the autofocus detector. This reduces the cost of the autofocus system as well as the alignment effort.

Due to the dual use of camera 16 for the autofocus system and for microscopic imaging, auto-focusing and microscopic imaging are preferably operated in a time-multiplexed fashion, i.e. automatic focusing and microscopic imaging are performed in alternating, sequential steps, wherein light sources 10 and 20 are switched on and off in an alternating fashion.

Figure 4:
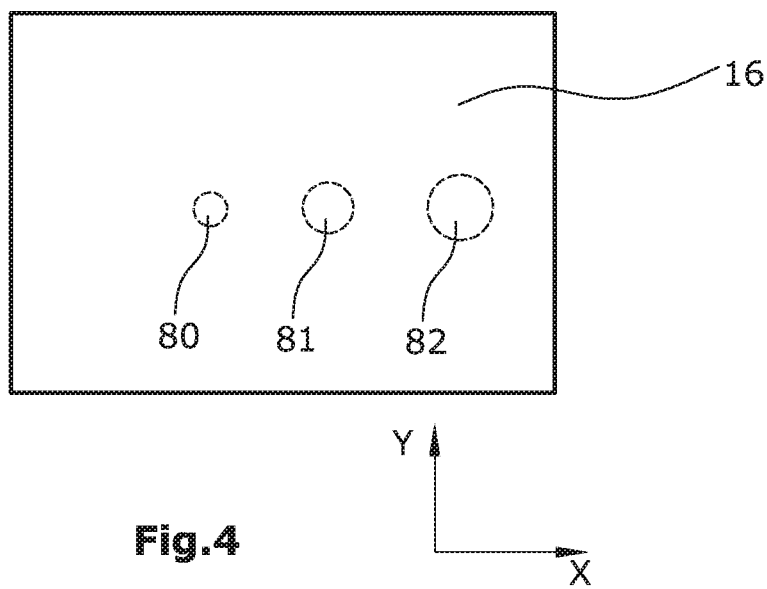
FIG. 4 shows schematically the autofocus detection pattern of the detector used in the autofocus system shown in FIG. 3.

FIG. 4 shows the autofocus detection pattern on camera 16 when reference surface 70 is in focus. Since the autofocus illumination beam path is tilted relative to the optical axis of the microscope beam path (defined by objective 30), the autofocus reference pattern projected towards the sample is a spot which moves laterally in dependence of the axial distance between the objective 30 and the sample 61. With reference to FIG. 4, the autofocus detection pattern contributed by reference surface 70 is spot 80, the autofocus detection pattern contributed by interface 71 is spot 81, and the autofocus detection pattern contributed by interface 72 is spot 82.

In this example, it is known a priori that three interfaces exist in the sample, and that the interface closest to the objective is to be chosen as the reference surface. It is further known that the closer an interface lies to the microscope objective, the further the autofocus detection pattern backscattered from that interface is shifted towards low X coordinates (see coordinate system defined in FIG. 4). The computer analyzing this autofocus detection pattern therefore fits three circular spots to the observed intensity pattern, and identifies the spot with the lowest X coordinate as the contribution from the reference surface. The deviation of this spot's X position from a pre-determined in-focus spot position provides a direct, linear measure of the magnitude and direction of the deviation of the current focus position from the correct focus position.

Further information can be obtained from the spot size and sharpness, and can optionally be considered by the image analysis to improve focusing speed or accuracy: A spot contributed by an interface in the correct focus plane will be in sharp focus, while spots backscattered from other planes will be defocused. However, it should be noted that the size and sharpness information alone do not pro-vide unequivocal information about the direction of a focus deviation, since a symmetric defocusing is observed for focus positions that are too far from or too close to the microscope objective.

The autofocus beam geometry used in this example is known in the art, e.g. from U.S. Pat. No. 4,687,913 or from E. Hellen & D. Axelrod: "An automatic focus/hold system for optical microscopes", Rev. Sci. Instr. 61 (12), p. 3722, 1990, and is often designated as a "skew beam" geometry. It provides a light spot on the detector which moves laterally as the focus deviates from the optimum focus position, giving an indication of direction and distance to the optimum position. However, the skew beam geometry has previously only been used in combination with simple photodiode detectors, which could provide information on direction and distance in a narrow neighborhood around the optimum focus position. They were hence used in combination with a closed feedback loop, once the optimum focus position was established. In the prior-art documents mentioned above, initial establishment of the focus position does not appear to be automated at all, but needs to be performed manually. Combining the "skew beam" geometry with a camera detector, as proposed in this inventive embodiment, provides unexpected benefits:

(a) Due to the large field of view of the camera and the detailed information about the spatial distribution of light, a linear measure for the distance of the current focus position from the correct position can be determined over a large range and with high precision. By determining the "center of mass" of the intensity distribution, even a blurred spot can be localized with sub-pixel accuracy on the camera. A linear relationship between focus setting and spot position on the camera is maintained over the full range of spot positions on the camera, allowing a fast, single-step correction of significant focus errors. This in contrast to photodiode-based autofocus detectors, which are limited to slow iterative focusing, or closed-loop maintenance of a pre-established focus position.

(b) The detailed information available on the camera allows the discrimination between multiple reflections. If the reflection to be tracked by the autofocus detector stems e.g. from the upper side of a microscope slide, there will be additional reflections from the bottom surface of the slide, and from the interface between the upper side of the sample and air (that inter-face either formed by a coverslip, or by a liquid meniscus of unknown height and shape). A simple photodiode-based detector, when designed to cover a larger capture range, will integrate or average over the resulting multiple reflected spots, and will not be able to obtain the correct focus information. In contrast, in the camera image of the present invention, multiple spots are discriminated by their respective positions and/or blurred diameters. The spot corresponding to the reference surface can be identified, isolated from the contributions from additional interfaces, and analyzed to robustly determine the focus positions.

It will be appreciated by one skilled in the art that the use of either a dedicated autofocus detector or a microscope main camera in the autofocus system does not depend on the type of height encoding (e.g. astigmatism-based or lateral position-based, as shown in the examples above) that is selected for a given embodiment. Hence, it is possible to combine astigmatism-based encoding with using the microscope's main camera for detection of the autofocus detection pattern. It is equally possible to use a dedicated autofocus detector in combination with lateral position-based encoding. In the latter embodiment, the autofocus detector does not have to be a two-dimensional camera, but can also be a line detector (i.e. a one-dimensional detector array).

Other encoding approaches are known in the art for conventional autofocus systems which require isolated single reference surfaces, and can be adapted for the invention. As discussed in example 2, the spot size and sharpness—i.e. the direct effect of defocused imaging of a reference spot—can be used to encode for focus deviations. However, due to the missing directional information, it may be required to perform at least two focus measurements in different focus positions to determine the correct focus position. Identification of the contribution from the reference surface in the presence of contributions from further interfaces is still possible in suitable sample situations, e.g. if the reference surface provides the strongest detection pattern contribution due to a large refractive index step.

While the examples above show the use of the inventive autofocus system in an inverted micro-scope, it will be obvious to one skilled in the art that the system can also be adapted to upright microscopes, and that its benefits will equally apply in upright microscopes.

The invention claimed is:

1. A method for autofocusing a microscope at a correct autofocus position in a sample comprising the steps:
   generating a reference pattern by an autofocus light device,
   projecting, by the autofocus light device, the reference pattern through a microscope objective and towards a sample, whereby the reference pattern is backscattered by at least two interfaces being located at or close to the sample,
   projecting the backscattered reference pattern through the microscope objective and towards a detector which provides spatial resolution,
   obtaining, by the detector, a superposition of a number of detection patterns, each detection pattern related to one of the at least two interfaces,
   analyzing the superposition of detection patterns to identify at least one autofocus detection pattern related to at least one of the interfaces, and
   analyzing the at least one autofocus detection pattern to determine the direction and/or magnitude of deviation of the microscope objective's current focus position from a correct focus position.

2. The method according to claim 1, wherein obtaining a superposition of detection patterns further comprises obtaining a superposition of detection patterns wherein a position, a size a shape, or an X:Y aspect ratio of each detection pattern on the detector depends on a position of the at least one interface relative to the microscope objective.

3. The method according to claim 1, further comprising analyzing a distribution of autofocus light intensity to further define the autofocus detection pattern.

4. The method according to claim 1, wherein analyzing the superposition of detection patterns to identify at least one autofocus detection pattern further comprises using a priori knowledge of a geometry of the sample and/or a geometry close to the sample.

5. The method according to claim 1, wherein analyzing the superposition of detection patterns to identify at least one autofocus detection pattern further comprises using a priori knowledge of the number of interfaces and of their spatial order.

6. The method according to claim 1, wherein generating a reference pattern further comprises generating a reference pattern using an autofocus light device comprising an astigmatic lens.

7. The method according to claim 1, wherein generating a reference pattern further comprises generating a reference pattern comprising a beam path that is tilted relative to an optical axis of the microscope objective.

8. The method according to claim 1, wherein analyzing the at least one autofocus detection pattern further comprises:
   comparing a size, shape or position of the autofocus detection pattern to a size, shape or position of an autofocus detection pattern of a correct autofocus position; and
   using the comparison to determine the direction and/or magnitude of deviation of the microscope objective's current focus position from the correct focus position.

9. A system for autofocusing a microscope at a correct autofocus position in a sample, the system comprising:
   a microscope objective for observing a sample;
   an autofocus light device for projecting a reference pattern through the microscope objective towards the sample, wherein the reference pattern is backscattered by at least two interfaces located at or close to the sample;

a detector obtaining the backscattered reference pattern as a superposition of a number of detection patterns, wherein each detection pattern relates to one of the at least two interfaces; and a computer executing steps for:

identifying at least one autofocus detection pattern related to at least one of the at least two interfaces by analyzing the superposition of the detection patterns, and determining a direction or magnitude of deviation of the microscope objective's current focus position from a correct focus position by analyzing the autofocus detection pattern.

10. The system of claim 9, wherein the computer further executes the step of focusing a lens of the microscope objective based on the determined direction and magnitude of deviation.

11. The system of claim 9, wherein the autofocus light device comprises an astigmatic lens.

12. The system of claim 9, wherein the autofocus light device projects a reference pattern with a beam path that is tilted relative to an optical axis of the microscope objective.

13. The system of claim 9, wherein the one of the at least two interfaces comprises an interface close to the microscope objective.

14. The system of claim 13, wherein the autofocus detection pattern comprises the smallest detection pattern obtained by the detector.

15. The system of claim 9, wherein the one of the at least two interfaces comprises an interface between a transparent substrate supporting the sample and air between the transparent substrate and the microscope objective.

16. The system of claim 9, wherein the one of the at least two interfaces comprises an interface between a transparent substrate supporting the sample and the sample.

17. The system of claim 9, wherein the at least two interfaces comprises three interfaces, and wherein the detection pattern relates to a middle interface of the three interfaces.

* * * * *